United States Patent [19]

Stacy et al.

[11] 3,866,033
[45] Feb. 11, 1975

[54] PHOTOFLASH ASSEMBLY WITH SERIALLY ADVANCING PERCUSSIVE LAMPS

[75] Inventors: John C. Stacy, Watsontown, Pa.; John J. Vetere, Danvers, Mass.; Sedgwick R. Bennett, Williamsport, Pa.

[73] Assignee: GTE Sylvania Incorporated, Montoursville, Pa.

[22] Filed: Nov. 21, 1973

[21] Appl. No.: 417,955

[52] U.S. Cl............... 240/1.3, 354/142, 354/148, 431/92
[51] Int. Cl............................................. G03b 15/02
[58] Field of Search............ 240/1.3, 37.1; 95/11 L; 431/92, 93, 95; 354/126, 142, 148

[56] References Cited
UNITED STATES PATENTS

| | | | |
|---|---|---|---|
| 3,238,749 | 3/1966 | Reiber et al. | 240/1.3 X |
| 3,348,188 | 10/1967 | Wood | 240/1.3 X |
| 3,452,660 | 7/1969 | Schultz et al. | 240/1.3 X |
| 3,614,413 | 10/1971 | Beach | 240/1.3 |
| 3,714,874 | 2/1973 | Engelsmann et al. | 240/1.3 X |
| 3,727,040 | 4/1973 | Armstrong et al. | 240/1.3 |
| 3,751,656 | 8/1973 | Buckler et al. | 240/1.3 |

Primary Examiner—Fred L. Braun
Attorney, Agent, or Firm—Edward J. Coleman

[57] ABSTRACT

A photoflash magazine comprising a plurality of percussively-ignitable flashlamps with associated striker springs and reflector segments movably supported within a closed container having a front face window and stationary reflector portion located at a remote firing position in the container. Each lamp, spring and reflector combination is mounted on a respective pallet to provide an individual flash unit which is slidably retained in an endless channel or supported on an endless chain. The plurality of such flash units are advanced sequentially to the firing position by a sprocket wheel engaging the pallets or chain and driven by a rotor activated by a film advancing mechanism in a camera to which the magazine is attached. The firing position and window are offset from the camera lens sufficiently to reduce "red-eye" effect, and a mechanical coupling is disposed between the firing position and an access aperture in the magazine for transmitting a mechanical impulse from a camera actuating member to individually release a striker spring to fire a lamp at the firing position.

19 Claims, 9 Drawing Figures

PHOTOFLASH ASSEMBLY WITH SERIALLY ADVANCING PERCUSSIVE LAMPS

BACKGROUND OF THE INVENTION

This invention relates to multilamp photoflash assemblies and, more particularly, to a magazine containing a plurality of percussively-ignitable flashlamp units with associated striker springs and reflector segments and a mechanism for serially advancing the flashlamp units to a remote firing position.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a respective one of the four side walls of the cube. A spindle depends from the center of the flashcube base operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing electrically ignited lamps, a pair of lead-in wires pass through the lamp envelope to support therein a filament in combination with globules of ignition paste. When the flashcube is in the firing position, segments of the lead-in wires disposed outside the lamp envelope are securely engaged with electrical contacts in the camera socket, which in turn are connected by electrical conductors and a shutter actuated switch to the camera power source, usually a pair of dry cell batteries. When a photographer actuates the shutter release mechanism to take a picture, he also, by the same operation, closes the electrical circuit from the batteries to the ignition system in the lamp to thereby flash the lamp. The timing of the ignition of the combustible material in the lamp is synchronized with the exposure of the film by actuation of the shutter release so that efficient utilization of the light from the flashlamp may be obtained.

A not infrequent problem that has been faced by the average amateur photographer when using a battery operated flash system, however, has been failure of the lamp to fire due to weak batteries and/or dirt or corrosion on one or more of the electrical contacts in the system. To overcome this problem and provide improved flashlamp reliability, percussive-type flashlamps have been developed which may be mechanically fired without the need for batteries. As described in U.S. Pat. No. 3,535,063, for example, such flashlamps have a mechanical primer sealed in one end of the lamp in lieu of lead-in wires. This primer may comprise a metal tube extending from the lamp envelope and a charge of fulminating material in a wire supported in the tube. Operation of the percussive flashlamp is initiated by an impact onto the tube to cause deflagration of the fulminating material up through the tube to ignite the combustible disposed in the lamp envelope. The percussive-type lamps are also produced in subminiature envelope sizes and are employed in percussive flashcube units having respective preenergized striker springs and reflectors associated with each lamp, as described in U.S. Pat. No. 3,597,604. The percussive flashcube is indexed into firing position similarly to the electrical flashcube; however, the flash-lamp to be used is fired by the action of a member, associated with the camera shutter mechanism, moving up through the flashcube base to release the respective preenergized striker spring, whereby it sharply impacts against the primer tube of the lamp.

Another development in the field of multilamp flash units for providing additional convenience and flexibility is the provision of a flashlamp magazine comprising a container within which a movable strip or rotatable endless belt carrying a plurality of flashlamps is disposed. For example, the belt may be carried by sprocket wheels mechanically connected to and driven by the film advancing mechanism of the camera. The container includes a single reflector-backed firing position to which the flashlamps are sequentially advanced for successive ignition. Such magazines are particularly advantageous in that they may be designed to carry a sufficient number of flashlamps for use with an entire roll or cartridge of film without the need for changing the flash unit. For example, a 12-lamp magazine may be employed for successive flash operation with a 12-exposure roll of film. The following U.S. Pat. Nos. are examples of previously described magazines of this type: 2,835,787; 3,176,482; 3,238,749; 3,263,068; and 3,452,660.

All of these patents, however, describe electrically energized flash magazines. Accordingly, although providing a number of advantages, these devices are still prone to the reliability problems associated with an electrical flash system, namely, ignition failures due to weak batteries and/or dirty or corroded electrical contacts. As discussed hereinbefore, such problems have previously been overcome in flashcube units by the use of percussive lamps with associated preenergized striker springs. There appears to be no prior art, however, with respect to the packaging and operation of percussive-type flashlamps in a magazine configuration wherein the lamps are serially advanced to a firing position within a fixed container.

In view of the current trend toward smaller size cameras, compact multilamp flash units, such as the above discussed flash magazines, may also create photographic problems due to a substantial reduction in the lamp-to-lens distance. In the case of color film, the use of a flash-lamp too near the lens when photographing human subjects may create an undesirable condition known as "red-eye," in which red light from the flashlamp is reflected by the retinas of the subject's eyes onto the phorographic film to show the pupils as red on the developed color print. The only practical method of eliminating "red-eye" is to provide adequate separation between the camera lens and the flashlamp. One approach toward correcting this problem on small cameras employing flashcubes is described in U.S. Pat. No. 3,348,188, wherein a "flash extender" attachment is provided for supporting the flashcube at an increased distance from the associated camera. The more remote flash location thereby provided is also advantageous for black and white photography in that it can be used to produce limited shadows for highlight and depth effect purposes without excess contrast. The flash extender also has some obvious disadvantages, however, in that it is a cumbersome piece of equipment (typically about 2½ inches long) relative to the compact camera and flashcube, and being an extra attachment, it is often forgotten by the amateur photographer.

SUMMARY OF THE INVENTION

Accordingly, it is an object of the present invention to provide an improved multiple photoflash lamp assembly which may be operated without an electrical energy source and which serially advances the lamps during the operating sequence.

A particular object of the invention is to provide a percussive flashlamp magazine wherein the lamps are sequentially advanced to a firing position within a closed container.

Another object is to provide a multilamp flash unit having improved means for reducing or eliminating the "red-eye" effect.

Briefly, these objects are attained, in accordance with the invention, by a photoflash assembly comprising a plurality of percussive flashlamp-striker units movably supported on a base member, means for controlling the path of travel of the units, and means for sequentially advancing the units to a firing position along said controlled path of travel. More particularly, the movable flashlamp-striker units are housed in a closed container having a window at a remote firing position, which, when mounted on a camera, is offset from the lens thereof by a distance sufficient to reduce the effect of "red-eye." A mechanical coupling means is disposed between the remote firing position and an aperture in the base through which the coupling means is accessible to be mechanically activated for releasing the striker associated with a lamp located at the firing position.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
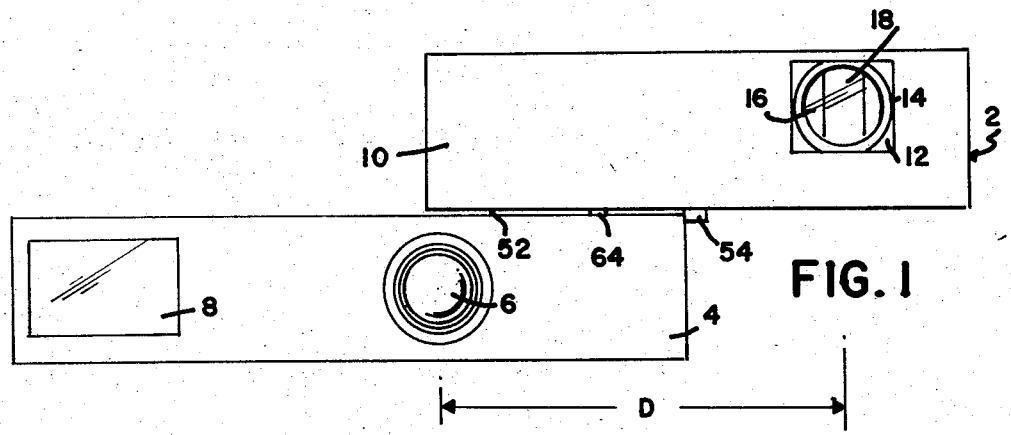
FIG. 1 is a front elevational view of a camera having a flash magazine according to the invention mounted thereon.

Referring to FIG. 1, a percussive flashlamp magazine 2 according to the invention is shown mounted on a camera 4 having a centrally disposed lens 6 and a viewfinder 8. The magazine 2 comprises a closed container 10 within which a plurality of percussive flashlamps are movably supported. The front face of the container 10 is provided with a window 12, of cellulose acetate for example, which defines a frame for the stationary segment 14 of a reflector. The stationary reflector segment 14 is secured to the inside of the front wall of the container and, when the flashlamp is in firing position behind the window 12, is aligned and in cooperative relationship with a movable segment 16 within which each flashlamp 18 is located. As will be noted in FIG. 1, the window 12 and the firing position aligned therewith are preferably offset a predetermined distance from the camera lens 6 for eliminating or reducing the effect of "red-eye." A suitable compromise between compactness and the desired photographic effects may be achieved by locating the remote firing position and window 12 such that the horizontal distance D between the center of lens 6 and the center of a lamp 18 at the firing position is at least about 2½ inches.

Figure 2:
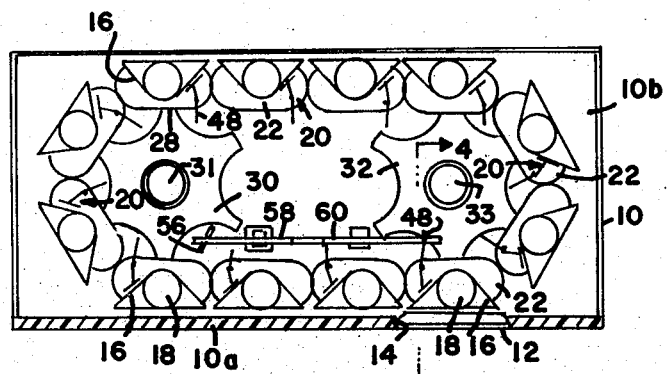
FIG. 2 is a plan view of the flash magazine of FIG. 1.
Figure 3:
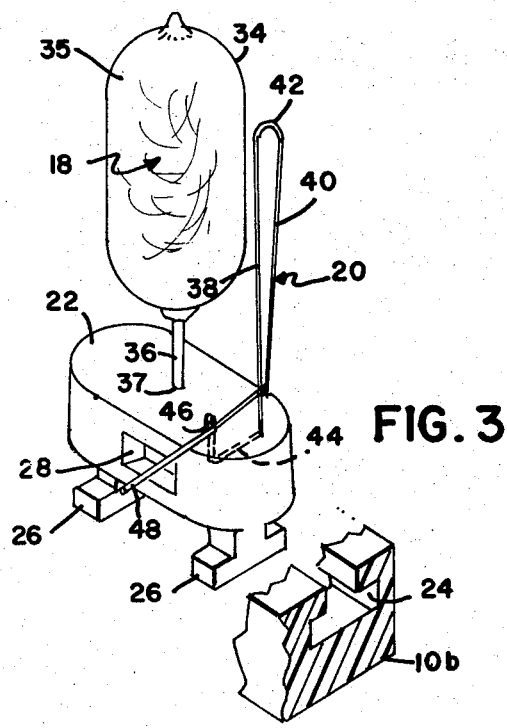
FIG. 3 is a detail perspective view of a single flashlamp-striker unit of the magazine of FIG. 2 with the reflector removed for clarity and illustrating the method of mounting the unit in the magazine.
Figure 4:
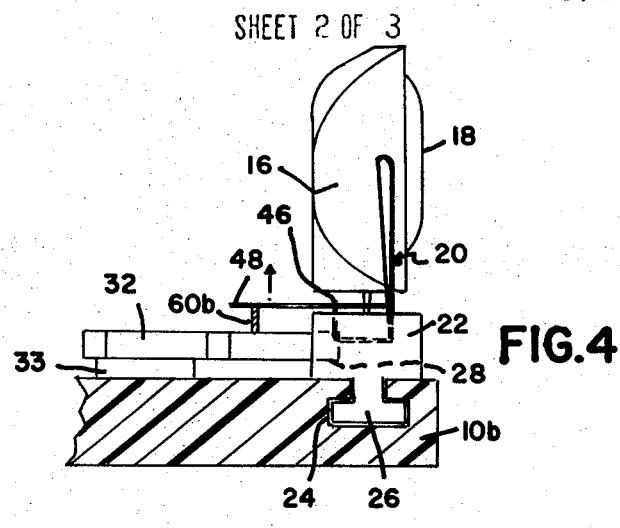
FIG. 4 is a fragmentary elevation, partly in section, taken on line 4—4 of FIG. 2.

As shown in FIG. 2, the container 10, which may comprise an assembly of molded plastic pieces, is provided with a front face 10a, within which the window 12 and stationary reflector segment 14 are disposed, and a base 10b upon which twelve lamp units are movably supported. Referring to FIG. 3, each lamp unit comprises a percussively-ignitable flashlamp 18 and an associated preenergized stroker spring 20 mounted on a movable pallet, or platform, 22. As will be described in detail hereinafter, the striker springs are individually releasable to fire their respectively associated lamps. In addition, as shown in FIG. 4, each unit also includes a movable reflector segment 16, mounted on the pallet behind the flashlamp. The reflector segment may be shaped to fit snugly upon and be supported solely by the lamp envelope, with a clearance being provided below the reflector to permit free movement of the striker, upon release, to impact against the lamp.

Each pallet 22 is slidably retained in a channel 24 contained in the base 10b by means of flanged portions 26 which depend from each pallet and engage grooves in the channel, as illustrated. The 12 pallets 22 are arranged to abut one another in the channel 24, and the channel is shaped to control the path of travel of the movable pallets as illustrated in FIG. 2. More specifically, channel 24 is shaped as an endless loop positioned so that upon movement of the train of pallets, the flashlamp striker units will be sequentially advanced to the firing position behind window 12. Such movement of the train pallets 22 is facilitated in this embodiment by means of a drive sprocket wheel 30 located toward one end of the channel loop and an idler sprocket wheel 32 located toward the other end of the loop. Wheels 30 and 32 are rotatably mounted on the base 10b by means of shafts 31 and 33, respectively. The side of each pallet facing the inside of the channel loop is provided with a notch 28 suitable for engagement by a sprocket, and each of the wheels 30 and 32 are positioned so as to engage one or more of these pallets by means of the notches and thereby translate rotary motion of the shaft and wheels to longitudinal motion by the train of pallets. If desired, the pallets may be interconnected with articulated couplings.

As shown particularly in FIG. 3, each lamp 18 comprises an hermetically sealed light-transmitting envelope 34 of tubular shape having a primer depending therefrom. A filling of combustible foil 35, such as zirconium, and a combustion-supporting gas, such as oxygen, are disposed in the envelope. The primer comprises a metal tube 36 coaxially depending from the envelope and within which a wire anvil and a charge of fulminating material are disposed. Each lamp is vertically supported on its respective pallet by means of a bore 37 in the pallet into which the primer tube 36 is inserted.

Each preenergized striker spring 20 comprises a folded torsion device typically formed from 0.021 inch music wire about 2.5 inches long. The wire is shaped to form a hairpin torsional section having segments 38 and 40 joined by a bight 42. The end portion of segment 38 is shaped to define a stationary supporting foot 44, the tip of which is shaped to define a catch 46. Foot 44 is seated in an enlongated slot (not shown) formed in the pallet 22, the slot being sufficiently shallow to permit catch 46 to project above the upper surface of the pallet. Accordingly, foot 44 and a portion of catch 46 are shown in dashed lines in FIGS. 3 and 4. The end portion of segment 40 is shaped to define a striker 48, which when the spring is preenergized, or cocked, as shown, crosses over the supporting foot 44 and is restrained by the catch 46.

Initially, the striker 48 may be formed at an angle of about 90° to the stationary supporting foot 44, although the angle through which the striker is rotated to position it behind catch 46, as shown, may be of any value that does not cause over stressing of the wire.

To enable operative mounting of the magazine 2 on camera 4, the rotatable drive shaft, or spindle, 31 is provided with a depending portion in the form of a mounting post 52 (FIG. 5) which is shaped to be indexably receivable in a rotatable socket (not shown) on the top face of camera 4. Preferably, the socket is coupled to the film advancing mechanism (not shown) in the camera so that it may be rotatably indexed in response to each film advance operation. For example, camera 4 may have a socket and operating mechanism of the type generally available for use with percussive flashcubes, such as that described in U.S. Pat. No. 3,602,618. In this Instance however, contrary to the manner of using the rotatable flashcube, the magazine container 10 must be held in a fixed position with respect to the camera, while the drive shaft 31 and its depending mounting post 52 are permitted to rotate with the socket. Accordingly, the magazine is also provided with an adjustable post 54 (FIGS. 1 and 5) depending from base 10b and adapted for engaging the edge of the camera when the magazine is mounted thereon.

Figure 5:
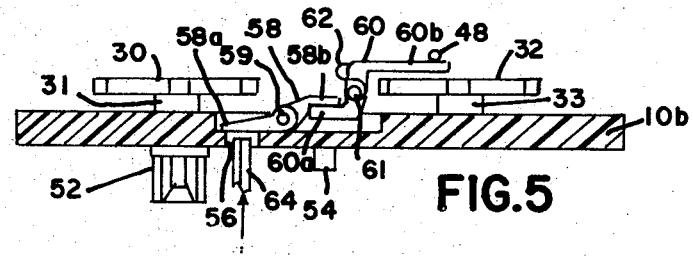
FIG. 5 is a simplified elevation, partly in section, of the interior mechanism of the mechanism of the magazine of FIG. 1.

Firing of a flashlamp located at the remote position behind window 12 is accomplished through a mechanical coupling means disposed between said firing position and an aperture 56 through base 10b near mounting post 52. More specifically, in the embodiment of FIGS. 1 and 5, the coupling means is shown as comprising a system of first and second dual acting levers 58 and 60 each pivotally mounted on base 10b by means of fulcrum pins 59 and 61, respectively. One arm 58a of the lever 58 is disposed over aperture 56 so as to be accessible therethrough to external actuating means, while the other arm 58b is pivotally linked to an arm 60a of lever 60. This pivotal linkage may be provided merely by an area of contact between the bottom surface of arm 58b and upper surface of arm 60a, as illustrated, or the two arms may be pivotally connected by means of a pin. As illustrated in FIGS. 2–5, the cocked firming springs 20 on each pallet 22 are arranged with the strikers 48 projecting beyond the periphery of the top surface of the pallet toward the inside of the channel loop. Another arm 60b of lever 60 is positioned so as to normally underlie the striker 48 projecting from the pallet 22 located at the firing position behind window 12. To assure that arm 60b returns to this position below the striker after each actuation, and that it does not unintentionally release a striker upon jarring of the magazine during handling and shipping, lever 60 is biased to this quiescent position by a loading spring 62. If necessary, arm 60b may be appropriately shaped to clear wheel 32 and reach the level of the striker, as shown in FIG. 5.

Actuation of the lever system 58, 60 to flash a lamp at the firing position is effected by a actuating member 64 (FIG. 5) moving up through aperture 56 to engage and push lever arm 58a upwardly away from base 10b, whereupon the resulting downward movement of arm 58b pushes arm 60a downwardly, which in turn causes an upward deflection of lever arm 60b away from the base. The upward deflection of arm 60b pushes the overlying striker 48 upwardly by a distance sufficient to clear the top of catch 46 (FIG. 3). The striker then swings clockwise as viewed from above, and hits and indents the impact sensitive primer tube 36, at a high velocity to cause deflagration of the fulminating material located therein and thus ignite the combustible foil 35. In the typical application to FIG. 1, actuating member 64 may be part of a camera 4 mechanism, such as that described in U.S. Pat. No. 3,602,618 for use with percussive flashcubes, which is designed to enable a photographer to flash a lamp in synchronization with the tripping of the camera shutter to take a picture.

To illustrative overall operation, use of the described flash magazine will now be described with respect to a camera of the type described in U.S. Pat. No. 3,602,618. The photographer loads the camera 4 with a film cartridge and, by operating the film advancing lever (not shown), advances the film to the first frame or exposure. The flashlamp magazine 2 is then mounted on top of the camera. The camera mechanism of U.S. Pat. No. 3,602,618 is designed so that insertion of the mounting post 52 into the complementary receiving socket in the camera causes upward movement of the actuating member 64 to an intermediate position for sensing purposes. In the present application, this sensing movement causes a slight actuation of the lever system until contact between arm 60b and the preenergized striker 48 (at the firing position) restricts further movement. The camera is now ready for taking a picture. On the other hand, if a released striker (used lamp) is in the firing position, the upward movement of member 64 is not restricted and actuates an indicator signaling the presence of a used lamp.

When the shutter is actuated to effect an exposure, the camera mechanism synchronously actuates a further movement of member 64 to its maximum upward position. In traveling to this position, member 64 actuates the lever system 58, 60 sufficiently to cause release of striker 48 to fire its associated lamp at the firing position behind window 12.

To prepare for the next picture, the photographer needs only to operate the film advancing lever (not shown) in the usual manner. This not only advances the film in the film cartridge to the next frame but it also advances the train of pallets 22 in the magazine 2 to carry a fresh lamp-spring-reflector unit into firing position in window 12. More specifically, operation of the film advance mechanism causes the camera socket and the attached mounting post 52 to be rotated by a quarter of a turn, whereupon associated cam surfaces in the camera mechanism cause member 64 to be retracted and the rotation of post 52 is transmitted via drive shaft 31 to sprocket wheel 30. The turning sprocket wheel thereupon moves the train of pallets 22 along channel 24 and thereby translates this increment of rotation into an increment of longitudinal motion sufficient to sequentially advance one pallet-carried, flashlamp-striker unit into firing position with its reflector segment 16 aligned with the stationary reflector segment behind window 12.

The foregoing operations may be repeated several times to take several flash pictures in rapid succession if desired. In the illustrated flash magazine, twelve lamps are available to be sequentially flashed in response to successive indexing. Accordingly, the magazine is particularly convenient for use with the commonly available twelve-exposure film cartridges.

Figure 6:
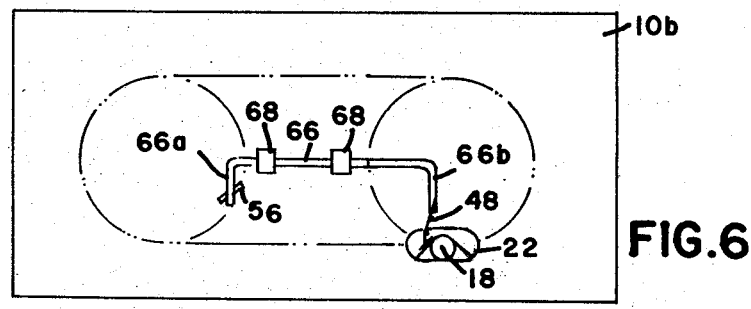
FIG. 6 is a simplified plan view of the magazine of FIG. 1 illustrating an alterative mechanical coupling means, with the sprocket wheels removed for clarity and only the lamp-striker-reflector unit at the firing position being shown.
Figure 7:
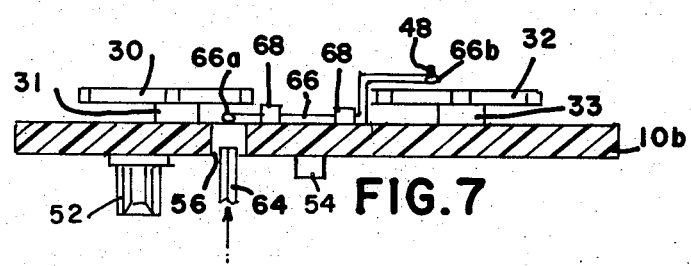
FIG. 7 is a simplified elevation, partly in section, of the magazine of FIG. 6 with the sprocket wheels included but the lamp unit removed for clarity.

FIGS. 6 & 7 illustrate an alternative mechanical coupling means that can be used for releasing a striker at the firing position in response to actuation by member 64. The coupling comprises a linear shaft 66 mounted on a base 10b, for example by brackets 68, so as to be rotatable about its own axis. One end of the shaft has a projection 66a which lies over aperture 56 so as to be accessible therethrough to actuating member 64. The other end of the shaft is offset to lie above wheel 32 and has a projection 66b which underlies striker 48 of the flashlamp pallet 22 located at the firing position. As shown, projections 66a and 66b are approximately normal to the axis of shaft 66. Upon actuating the camera shutter, the resulting upward movement of actuating member 64 through aperture 56 pushes against projection 66a and thereby causes the shaft 66 to rotate about its axis; the concurrent rotation of projection 66b pushes the overlying striker 48 upward sufficiently to release it for firing its associated flash-lamp. The sensing phase of operation preceding shutter actuation is similar to that described for the embodiment of FIG. 5; in this instance, the rotation of shaft 66 is restricted by contact between projection 66b and a cocked striker 48 at the firing position and thereby restricts upward movement of member 64.

Figure 8:
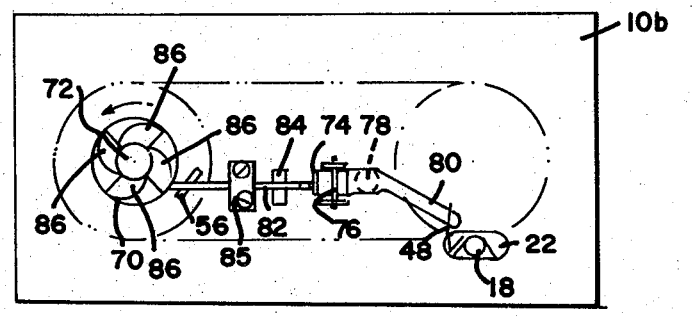
FIG. 8 is a simplified plan view of the magazine of FIG. 1 illustrating another alternative mechanical coupling means, with the sprocket wheels removed for clarity and only the lamp-striker-reflector unit at the firing position being shown.
Figure 9:
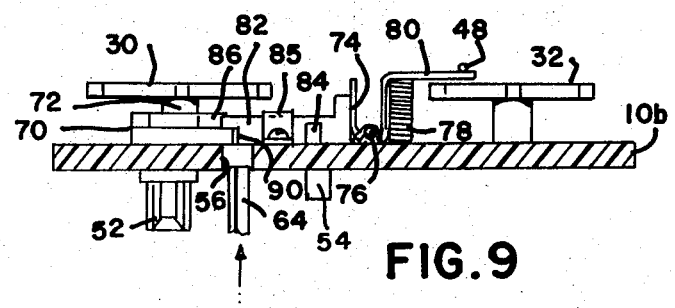
FIG. 9 is a simplified elevation, partly in section, of the magazine of FIG. 8 with the sprocket wheels included but the lamp unit removed for clarity.

When using the mechanical coupling of FIG. 5 or FIG. 6, all energy for actuating the levers or shaft to release a striker must be provided by the camera mechanism through actuating member 64. Hence, operation of these magazines is dependent upon the presence of adequate energy in the camera mechanism. In many applications, however, it is desirable to substantially reduce or virtually eliminate the power required from the camera to cause flashing of a percussive lamp at the firing position. To accommodate such applications, FIGS. 8 and 9 illustrate a spring-loaded mechanical coupling which is self-cocking in response to operation of the film advancing mechanism in the camera. This coupling, which is used in lieu of lever system 58, 60 or shaft 66, comprises a cammed disk 70 mounted on base 10b by means of a rotatable drive shaft 72 fixedly attached to the rotatable mounting post 52. Sprocket wheel 30 is also mounted on shaft 72 and vertically spaced above disk 70. At the firing position, a tilting type lever means 74 is pivotally mounted on base 10b by a pin 76 and spring-loaded by a compression coil spring 78. A striker release arm 80 extends from the spring-loaded side of lever 74, as illustrated. Disposed between the cammed disk 70 and lever 74 is an actuating bar 82, which is mounted on base 10b by guides 84 and strap spring 85 so as to be slidable along its axis and movable in an upward direction (as viewed in FIG. 9) against the strap spring 85. Disk 70 has a plurality of cammed surfaces 86, and the upper left end of bar 82 bears against one of these surfaces when the bar is positioned flat on base 10b as shown, the bar being spring-loaded toward this position by spring 85.

In operation, when the film advancing mechanism in the camera is actuated, the camera socket rotates by a quarter of a turn and thereby causes a like common rotation of post 52, shaft 72, disk 70 and sprocket wheel 30. Accordingly, at the same time, the film is advanced and the lamp pallets are indexed, the rotating cam surface 86 and pushes bar 82 to the right, thereby forcing the bar against the free side of the spring-loaded lever 74 to tilt and hold the lever in a cocked condition, as shown in FIG. 9. Disk 70 is initially oriented so that the cam surface 86 permits a maximum leftward excursion of bar 82, and the cam surface is shaped to produce a maximum rightward excursion of the bar upon rotation of the disk 70 by a quarter of a turn. As the rotating cam surface advances the bar 82 into the cocked position, a portion of the bar is moved to overlie aperture 56 to be accessible to actuating member 64, and lever 74 is tilted to move arm 80 below striker 48, as the pallet carrying that striker moves into position for firing. Hence, in the cocked condition, arm 80 is disposed between base 10b and striker 48 at the firing position. During the sensing step, the upward movement of member 64 is restricted by bar 82, thereby indicating the firing mechanism is cocked. If the mechanism is uncocked, indicating a used lamp in the firing position, bar 82 will be in a raised position, and the unrestricted upward movement of member 64 will actuate the used lamp indicator.

When the camera shutter is actuated to effect an exposure, the resulting further movement of member 64 to its maximum upward position pushes bar 82 upwardly away from base 10b. Such actuation releases the upper left end of the bar from the cammed disk 70, which in turn releases the spring-loaded lever 74. The released energy of spring 78 causes lever 74 to tilt counterclockwise, and, in so doing, the released bar 82 is forced to the left until stopped by its left lower end surface 90 coming into contact with the upper portion of disk 70. At the same time, arm 80 is deflected away from the base by the released spring energy and thereupon lifts the overlying striker 48 from catch 46, thereby releasing the stroker to fire its associated lamp at the firing position.

Upon again actuating the film advancing mechanism, the resulting rotation of disk 70 and loading of spring 85 cause the upper left end of bar 82 to return to engagement with cam surface 86. Hence, at the end of the quarter turn rotation of disk 70, bar 82 again cocks lever 74 in readiness for firing the fresh lamp which had been indexed to window 12 during the rotation cycle.

Alternative methods of transporting the flashlamp-striker-reflector units and controlling their path of travel may be used. Instead of moving a train of pallets in a channel, the individual units comprising a flashlamp 18, striker 20 and a reflector segment 16 may be mounted on respective platforms which are supported on and carried by an endless chain, which in turn is supported on and driven by the sprocket wheels 30 and 32. In operation, the sprocket wheels translate the rotary motion of the spindle (post 52 and drive shaft 31) to a longitudinal motion by the chain, which thereupon sequentially advances the flashlamp-striker-reflector units to the firing position.

Preferably the pallets 22, or chain and platforms, and the sprocket wheels, drive shaft, mounting post and container are fabricated of economical, lightweight plastic materials.

In lieu of using a chain as the lamp unit carrier means, an endless belt could be employed, and in lieu of using sprocket wheels, a friction drive could be employed to move the belt. The movable reflector segments could be formed in a suitable belt material, e.g., a plastic, and platforms could be projected from the belt for supporting the lamps and striker springs. In this case, the firing position would be provided with a bracket for preventing upward motion of the platforms when the spring is released.

It is also contemplated that in some applications, it may be desirable to use only a fixed reflector, and thereby provide a more compact package. That is, lamp-striker units, having no reflector segments, would be sequentially advanced to a position within a fixed reflector. Also, in lieu of a drive shaft 31, and mounting post 52, any other type of spindle means may be rotatably mounted on the base. Further, if "red-eye" is of insufficient concern, or not a problem due to camera configuration, the firing position and window 12 may be relocated on the flash magazine, with the aperture 56 disposed at the firing position so that each striker 48 thereat may be directly released by the camera actuating member 64, without the need for mechanical coupling means.

Accordingly, although the invention has been described with respect to specific embodiments, it will be appreciated that modifications and changes may be made by those skilled in the art without departing from the true spirit and scope of the invention.

What we claim is:

1. A photoflash assembly comprising, in combination:
   a base member;
   a plurality of units, each including a percussively ignitable flashlamp and an associated preenergized striker movably supported on said base member, each striker being individually releasable to fire its respective flashlamp;
   means for controlling the path of travel of said movable flashlamp-striker units;
   and means for moving said plurality of units along said controlled path of travel to advance said flashlamp-striker units sequentially to a firing position.

2. The assembly of claim 1 wherein each of said flashlamps has a primer tube depending therefrom, and each of said units includes a platform containing a bore for receiving the primer tube of a respective one of said flashlamps to provide support therefor.

3. The assembly of claim 2 wherein each of said preenergized strikers is a portion of a folded torsion spring comprising a substantially hairpin torsional section having two segments joined by a bight, said striker portion projecting from one of said segments, a supporting foot projecting from the other of said segments and fixedly mounted on a respective one of said platforms, and a catch formed at the tip of said foot, said striker portion crossing said foot with said catch restraining said striker portion in a cocked condition.

4. The assembly of claim 1 wherein said means for controlling the path of travel comprises a channel in said base member, each of said units includes a pallet upon which said associated flashlamp and striker are mounted, each of said pallets being slidably retained in said channel and having means suitable for engagement by a sprocket, and said means for moving said plurality of units comprises a sprocket wheel rotatably mounted on said base with the sprockets thereof engaging one or more of said pallets.

5. The assembly of claim 4 wherein said sprocket wheel is mounted on said base by a rotatable drive shaft means having a portion depending from said base which is indexably receivable in rotatable mounting means on a camera, said camera having a film advancing mechanism coupled to said rotatable mounting means which is operative upon actuation to rotate said drive shaft and sprocket wheel to thereby advance said flashlamp pallets along said channel.

6. The assembly of claim 4 wherein each of said units further includes a reflector mounted on its respective pallet behind the flashlamp thereon.

7. The assembly of claim 6 wherein said base comprises one side of a closed container having a window in the front face thereof, said container enclosing said sprocket wheel and said plurality of units retained in said channel, said firing position being aligned with said window, and further including a stationary reflector segment disposed in said container at the front face thereof and aligned with the window therein so that it will in turn be aligned with each pallet reflector as its associated flashlamp-striker unit is moved into firing position to thereby provide a two segment reflector for each lamp in firing position.

8. The assembly of claim 7 wherein said assembly is receivable on a camera having a mechanical actuating member for firing one of said flashlamps, said base has an aperture therethrough, and further including mechanical coupling means mounted on said base and disposed between said aperture and said firing position, said coupling means being accessible through said aperture to be actuated by said actuating member and thereupon being operative to release the striker of a unit disposed at said firing position to fire the flashlamp associated therewith.

9. The assembly of claim 8 wherein said window and the firing position aligned therewith are located such that when said assembly is mounted on a camera having a lens, said window and associated firing position are offset a predetermined distance from said lens for reducing the effect of "red-eye."

10. The assembly of claim 9 wherein the predetermined distance between the center of said lens and the center of a lamp at said firing position is at least about two and one-half inches.

11. The assembly of claim 1 wherein: said means for controlling the path of travel comprises carrier means on said base movable longitudinally thereof; each of said units includes a platform supported on said carrier means and upon which said associated flashlamp and striker are mounted; and said means for moving said plurality of units comprises a spindle rotatably mounted on said base, and a mechanism on said base for translating a rotary motion of said spindle to a longitudinal motion by said carrier means.

12. The assembly of claim 1 wherein said assembly is receivable on a camera having a lens, and said firing position is located on said base such that when said assembly is mounted on said camera, said firing position is offset a predetermined distance from said lens for reducing the effect of "red-eye."

13. The assembly of claim 12 wherein the predetermined distance between the center of said lens and the center of a lamp at said firing position is at least about 2½ inches.

14. The assembly of claim 1 wherein said assembly is receivable on a camera having a mechanical actuating member for firing one of said flashlamps, said base has an aperture therethrough, and further including mechanical coupling means mounted on said base and disposed between said aperture and said firing position, said coupling means being accessible through said aperture to be actuated by said actuating member and thereupon being operative to release the striker of a unit disposed at said firing position to fire the flashlamp associated therewith.

15. The assembly of claim 14 wherein said firing position is located such that when said assembly is mounted on a camera having a lens, the center of a lamp at said firing position is offset from the center of said lens by at least about 2½ inches.

16. The assembly of claim 14 wherein said mechanical coupling means comprises a system of first and second dual acting levers, one arm of said first lever being pivotally linked to one arm of said second lever, the other arm of said first lever being accessible through said aperture to be pushed away from said base by said actuating member, and a portion of the other arm of said second lever being located between said base and the striker of a unit disposed at said firing position, whereupon actuation of said other arm of the first lever away from said base causes deflection of said other arm of the second lever away from said base to thereby release said striker at the firing position.

17. The assembly of claim 14 wherein said mechanical coupling means comprises a substantially linear shaft rotatable about its axis and having a projection at each end approximately normal to the axis thereof, one projection being accessible through said aperture to be pushed against by said actuating member whereby said shaft and projections are caused to rotate about the axis of the shaft, and the other projection being located to underlie the striker of a unit disposed at said firing position, whereupon rotation of said shaft by said actuating member causes said last-mentioned projection to release said striker at the firing position.

18. The assembly of claim 14 wherein said mechanical coupling means comprises, a cammed disk having a rotatable drive shaft means which is indexably receivable in rotatable mounting means on a camera, a spring-loaded lever means having an arm located between said base and the striker of a unit disposed at said firing position, and a slidable bar disposed between said cammed disk and said spring-loaded lever with one end of said bar being adjacent said cammed disk, said camera having a film advancing mechanism coupled to said rotatable mounting means which is operative upon actuation to rotate said drive shaft and cammed disk whereby the rotary position of said cammed disk forces said bar against said spring-loaded lever to hold said lever in a cocked condition, the end of said bar adjacent said cammed disk being accessible through said aperture to be pushed away from said base by said actuating member, such actuation releasing said bar from said cammed disk to thereby release said spring-loaded lever whereupon said arm thereof deflects away from said base to release said striker at the firing position.

19. The assembly of claim 18 wherein said means for moving said plurality of units comprises a rotary member attached to said drive shaft means and operatively coupled to said plurality of flashlamp-striker units.

* * * * *